United States Patent [19]
Christensen et al.

[11] 3,842,804
[45] Oct. 22, 1974

[54] FISH-REARING FACILITY

[75] Inventors: Bernard J. Christensen, Bellevue; Harry H. Chenoweth, Kirkland, both of Wash.

[73] Assignee: Hill, Ingman, Chase & Co., Seattle, Wash.

[22] Filed: June 5, 1972

[21] Appl. No.: 259,528

[52] U.S. Cl. ............................................... 119/3
[51] Int. Cl. ........................................... A01k 63/00
[58] Field of Search ........................... 119/2, 3, 4, 5

[56] References Cited
UNITED STATES PATENTS

| | | | |
|---|---|---|---|
| 3,418,973 | 12/1968 | Saito | 119/3 |
| 3,661,262 | 5/1972 | Sanders | 119/3 X |

FOREIGN PATENTS OR APPLICATIONS

| | | | |
|---|---|---|---|
| 453,843 | 4/1913 | France | 119/5 |
| 408,923 | 2/1910 | France | 119/3 |
| 346,564 | 4/1931 | Great Britain | 119/3 |
| 522,252 | 3/1921 | France | 119/3 |
| 1,800 | 1881 | Great Britain | 119/4 |

*Primary Examiner*—Hugh R. Chamblee
*Attorney, Agent, or Firm*—Robert W. Beach

[57] ABSTRACT

Water is withdrawn from a fish rearing tank by an air lift pump to a tank alongside the pond. Part of such water may be returned to the tank through aeration sprays. The balance of the water passes upward through a filter for removal of ammonia and other waste products and then is returned to the rearing pond. The filter includes a multiplicity of upright tubes submerged in water on which bacteria grow that act on ammonia waste in the water to remove it from the water. Periodically, sludge is removed from the sump and an equivalent amount of water is added to the filter tank. The multiplicity of upright filter passages may be formed by clusters of tubes, by a honeycomb construction, or by a sandwich of alternate flat and corrugated sheets. The filter elements may be of plastic material.

8 Claims, 7 Drawing Figures

INVENTORS
BERNARD J. CHRISTENSEN
HARRY H. CHENOWETH

BY

ATTORNEY

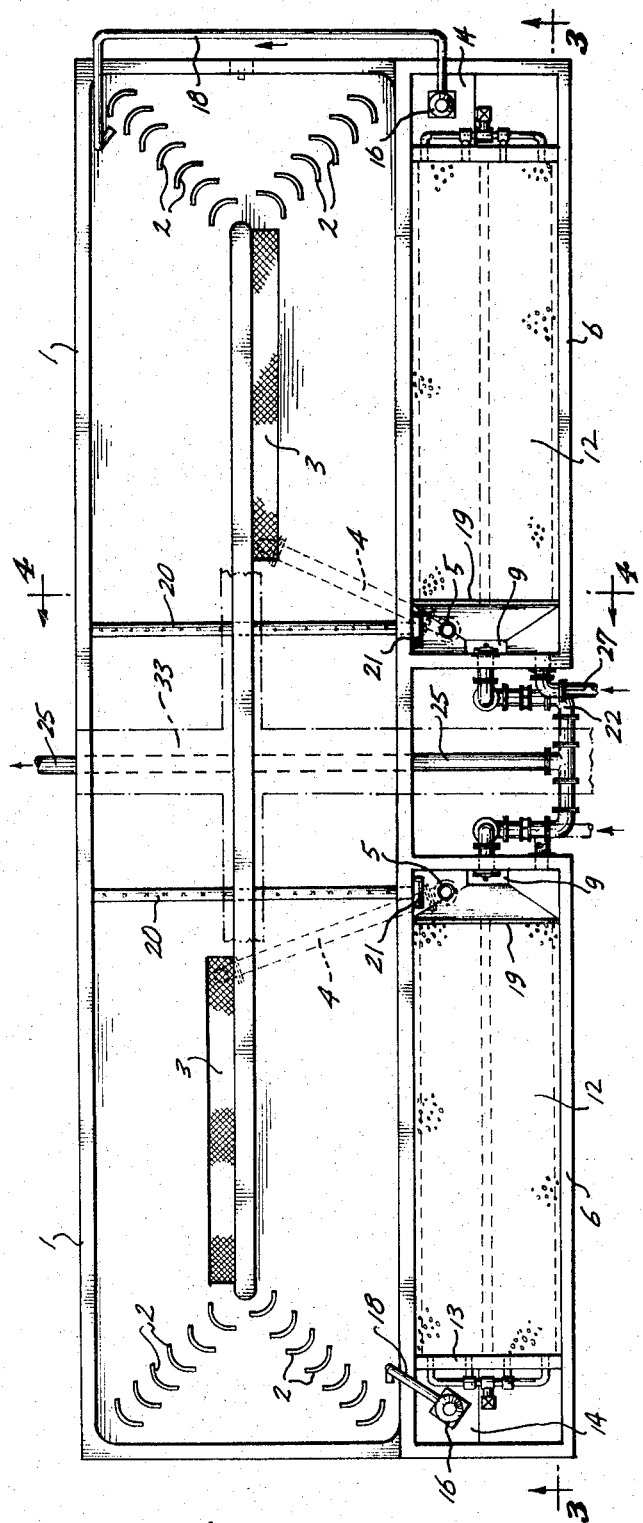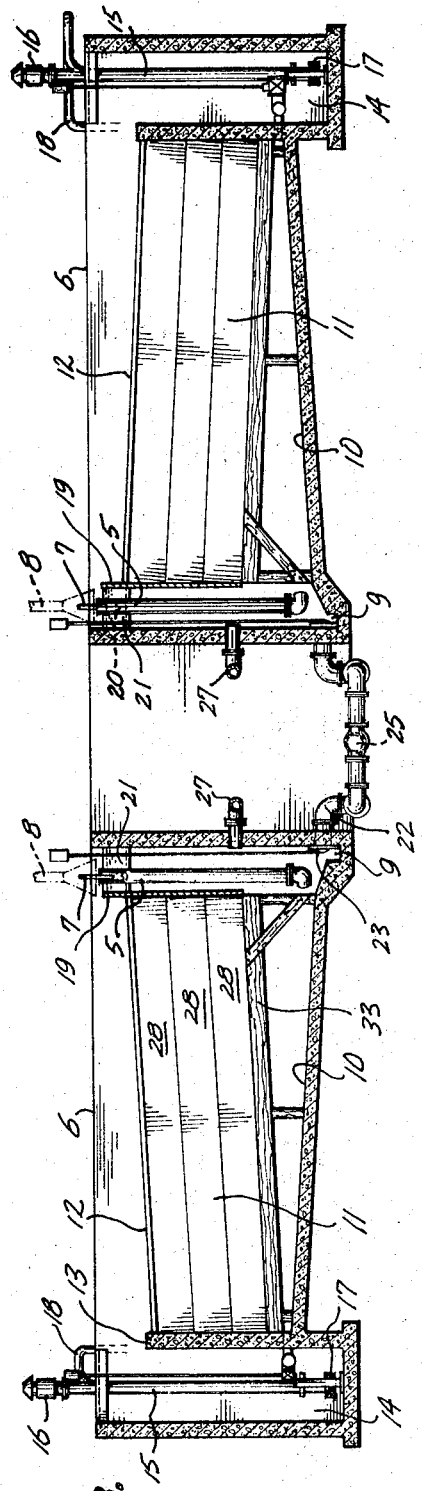

FISH-REARING FACILITY

In the fish-rearing environment of the present invention, it is a principal object to provide a submerged filter construction in which the circulation of water to be filtered is from the bottom of the filter upward with the provision of a sump below the filter so that debris from the filter can settle downward into the sump for removal to deter clogging of the filter.

An additional object is to provide a sump beneath a submerged filter which slopes downward to a collection trough from which the waste can be removed easily at periodic intervals.

By use of such construction as described above, it is an object to reduce the frequency with which the filter structure must be cleaned.

A further object is to provide an effective filter construction which is made of light durable material and which can be removed and replaced readily so as to reduce the labor of cleaning the filter structure when such cleaning is required, and provides adequate surface area for the accumulation of a suitable biological growth for removal from water of ammonia and other waste products.

FIG. 2 is a plan of the rearing pond and filter tank structure.

FIG. 3 is a vertical section through the filter tank structure taken on line 3—3 of FIG. 2.

Figure 1:
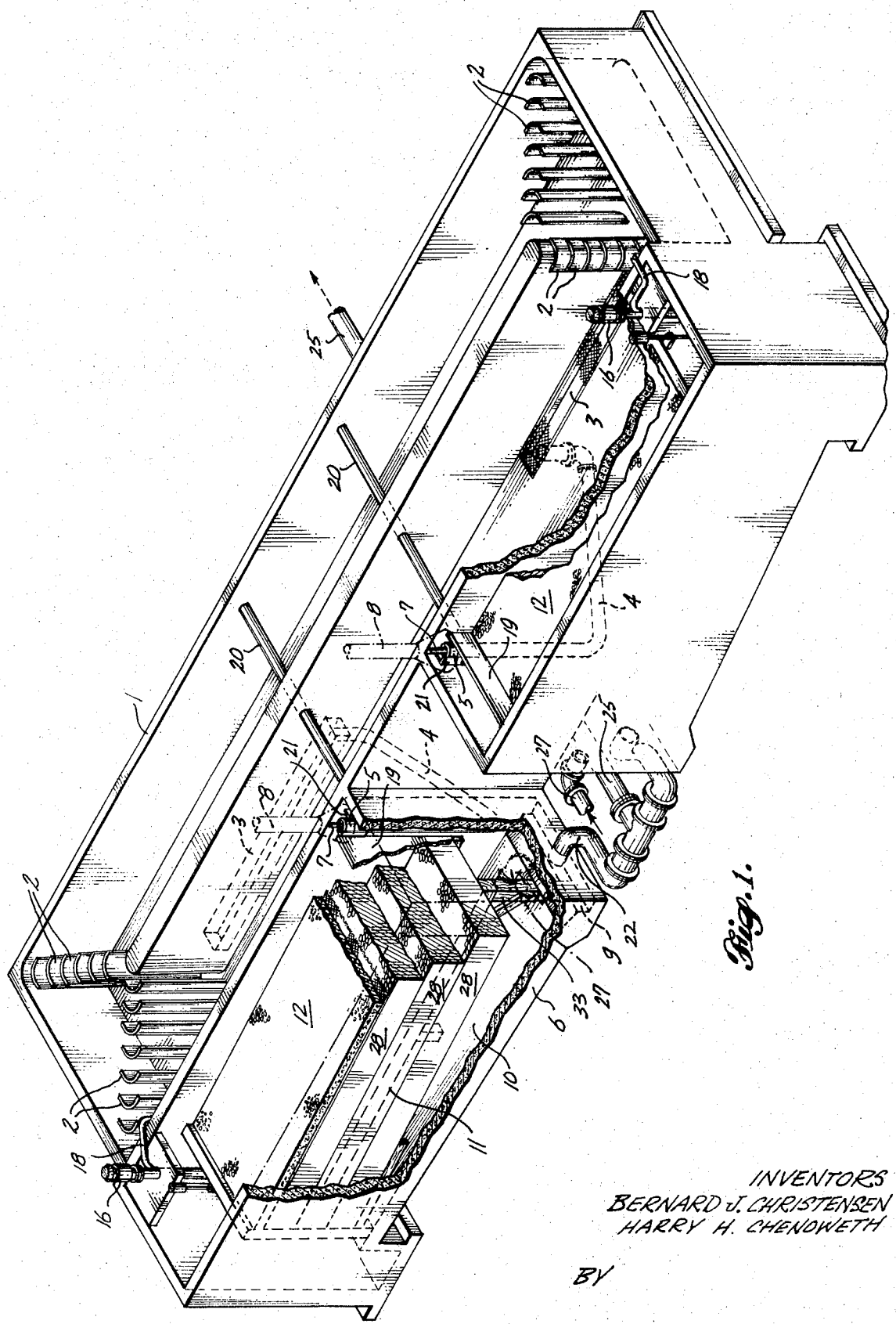
FIG. 1 is a top perspective of a fish-rearing pond and filter tank structure having parts broken away.
Figure 4:
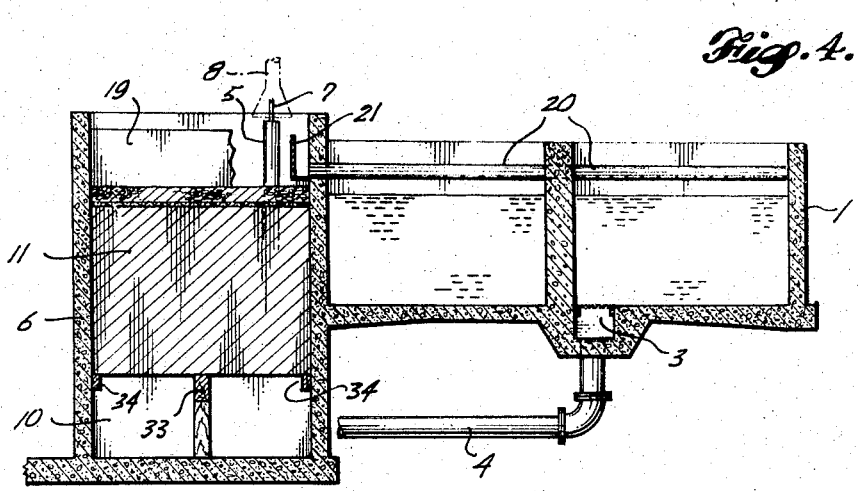
FIG. 4 is a transverse vertical section through the rearing pond and filter tank taken on line 4—4 of FIG. 2.

The fish-rearing pond 1 can be of any desired size and shape, and is illustrated in FIGS. 1, 2 and 4, as being of elongated rectangular shape having a divider along its center. It is preferred that the water in the tank be circulated orbitally to provide a current through the tank. A series of arcuate vanes 2 in each corner will direct the flow to reduce turbulence. Water is removed and returned to the tank continuously, or periodically, for the purpose of removing waste material from the water in the tank, and for aerating the water in the tank.

Water flows out of the central portion of the pond 1 through an elongated outlet trough 3 into a pipe 4. Such outflow is induced by an air lift pump 5 located in one end of an elongated filter tank 6 extending alongside the rearing pond 1 and having its length extending parallel to the length of the rearing pond. The pumping action is accomplished by supplying air to the pump casing tube through a central pipe 7. Air not absorbed by the water is released into a vent pipe 8 located above the air lift pump, as shown in FIGS. 3 and 4.

In the end of the filter tank 6 in which the air lift pump 5 is located is a sump trough 9 into which any debris that is readily precipitated from the water can settle. The floor 10 of the filter unit in tank 6 slopes downward to this sump trough. A biological filter 11 is located above this floor, and provides a multiplicity of upright tubular passages through which water can flow upward. The upper ends of such passages are covered by a perforated filter cover plate 12. The upper side of the filter formed by such cover slopes downward toward a weir 13 at the end of the filter 11 remote from the air lift pump 5 and sump trough 9.

The filter 11 is entirely submerged in water. The weir 13 over which water flows from the filter tank into the recirculation pump sump 14 maintains the water level constant in such tank. Water can be pumped from the bottom of such sump by pump 15 driven by motor 16 through the pump inlet 17 for discharge through pipe 18 back into the rearing pond 1, as shown in FIGS. 2 and 3. The openings from the discharge pipes are directed to induce circulation of the water within the rearing pond in a clockwise direction, as seen in FIG. 2, and indicated by the arrows in that figure.

Water will be withdrawn from the filter tank 6 and returned to the rearing pond 1 from the recirculation pump sump 14 to the extent that pump 15 is operated. The operation of the air lift pump 5 is, however, not dependent on the amount of water returned to the rearing pond by the pump 15. Any excess of water pumped by the pump 5 from the rearing pond over that returned to the rearing pond by the pump 15 will be returned directly from the air lift pump 5 to the rearing pond.

The wall 19 separates the air lift pump sump from the filter compartment of the filter tank 6, so that water cannot flow from the air lift pump sump directly over the top of the filter cover 12 to the recirculation pump sump 14, thus bypassing the filter. Excess water pumped by the air lift pump 5 can, however, flow back into the rearing pond 1 through a pipe 20 over a weir 21 at its entrance. The height of such weir will establish the static height of the water in the air lift pump sump. The pipes 20 are located above the surface of the water in the rearing pond 1, as shown in FIG. 4, and are perforated to discharge water from them in the form of sprays which will further aerate the water returned to the rearing pond through them.

As water passes slowly upward through the submerged filter 11, ammonia waste in the water produced by fish in tank 1 will be acted on by the biological growth on the walls of the filter tubular passages and removed from the upright water passing through the filter tank. Accumulation of biological material on the sides of the passages will slough off periodically, and the resulting debris will settle downward through the tubular passages of the filter onto the sloping surface 10 beneath it. Such precipitated sludge will gravitate down the slope toward the sludge trough 9. Sludge accumulated in the bottom of the air lift pump sump can be removed periodically at will through a discharge pipe 22 by opening valve 23 accomplished by manipulating handle 24.

Sludge discharge pipes 22 of adjacent filter tanks 6 can be connected together for discharge of sludge through the common discharge pipe 25. Movement of the sludge through pipes 22 and 25 can be accelerated by discharging a jet of water into the upper end of the filter tank 6 near wall 13. Water can be supplied to the air lift pump sump by a pipe 27 to replace the sludge and water removed from the system through the sludge discharge pipe 22.

Figure 5:
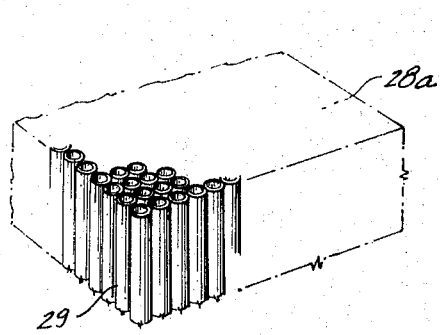
FIGS. 5, 6 and 7 are top perspectives of different types of filter unit construction.
Figure 6:
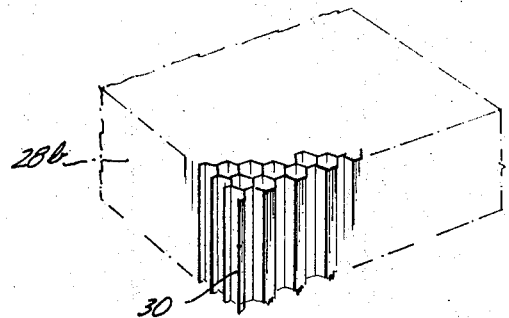
Figure 7:
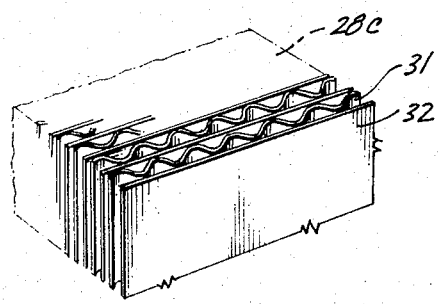

The filter 11 can be composed of several filter units 28 in superposed relationship, each of which has a multiplicity of upright passages extending through it. It is not necessary that such passages of the superposed units be in precise registration, but they must be in communication so that the debris can settle down through such passages from one filter unit through the next one below it into the chamber above the sloping floor 10. The upright passages can be formed by filter unit structures of different types. Representative types of filter units are illustrated in FIGS. 5, 6 and 7, respectively. The filter unit 28a, shown in FIG. 5, is composed of a cluster of cylindrical tubes 29 having their peripheries bonded together.

The filter unit 28b, shown in FIG. 6, is of honeycomb construction, each tubular passage 30 being hexagonal. The filter unit 28c, shown in FIG. 7, has corrugated sheets 31, and flat sheets 32, arranged in alternate or sandwich relationship, and contacting each other so as to provide passages extending through the filter. Preferably, the filter units 28a, 28b and 28c are made of plastic material, but they could be made of other materials, if preferred. Also, while all of the filter units 28, shown in FIG. 3, could be the same, different types of filter units, such as shown in FIGS. 5, 6 and 7, for example, could be combined.

The lowest filter unit 28 simply rests on a central rail 33 and cleats 34 secured to the sides of the filter tank 6, and the upper filter sections are laid on the lowest filter section. Whenever it is necessary to clean a filter tank, therefore, the cover 12 can be lifted off the filter, and then the filter units 28 can be lifted out of the tank 6 in succession. The sloping bottom 10 of the tank, as well as the tank walls, are then readily accessible for cleaning. When the cleaning operation has been completed, the filter units are replaced successively back in the filter tank on the rail 33 and cleats 34, and the cover 12 is applied to the filter. The filter is then ready to be used again.

We claim:

1. In fish-rearing apparatus, including rearing pond means, a filter tank interconnected therewith, and means mounted on the apparatus for transferring water from the rearing pond means to the filter tank and returning it to the rearing pond means, the improvement comprising biological filter means mounted in the filter tank, below the top thereof, and being substantially entirely submerged in water, said filter means including a plurality of tubular passages having their lengths extending upright, and means for supplying flow of water from the rearing pond means upwardly through said tubular passages of said biological filter means for return to the rearing pond means, said biological filter means being spaced above the bottom of the filter tank for forming a lower chamber to receive debris sloughed from the walls of said tubular passages.

2. In the apparatus defined in claim 1, the biological filter means including a plurality of superposed sections, the structure of each section being similar to that of the other sections and each section having upright tubular passages through which the water flows upwardly, the tubular passages in each section communicating with the tubular passages in an adjacent section.

3. In the apparatus defined in claim 1, the biological filter means including a multiplicity of upright cylindrical tubes secured together in a cluster forming the tubular passages.

4. In the apparatus defined in claim 1, the biological filter means being of honeycomb construction disposed with the apertures through the honeycomb forming the tubular passages.

5. In the apparatus defined in claim 1, the biological filter means including planar sheets and corrugated sheets secured together in alternate sandwich relationship to provide spaces forming the tubular passages.

6. In the apparatus defined in claim 1, the filter tank having a sludge sump communicating with the lower chamber of the filter tank, and the floor of the lower chamber sloping downward to said sludge sump for deposit of debris therein, and means for removing debris from said sludge sump.

7. In the apparatus defined in claim 1, the filter tank having an outlet weir over which water flows from the filter tank to the means for transferring water for return to the rearing pond for maintaining the level of the water in the filter tank at a substantially constant predetermined height.

8. In fish-rearing apparatus, including rearing pond means, a filter tank interconnected therewith, and means mounted on the apparatus for transferring water from the rearing pond means to the filter tank and returning it to the rearing pond means, the improvement comprising biological filter means mounted in the filter tank, below the top thereof, and being substantially entirely submerged in water, said filter means including a plurality of tubular passages having their lengths extending upright, means for supplying flow of water from the rearing pond means upwardly through said tubular passages of said biological filter means for return to the rearing pond means, means mounted on the apparatus and through which water is returned from the filter tank to the rearing pond means in a direction to effect circulation of water in the rearing pond means around an orbital path, and inlet means mounted in the rearing pond means and in the central portion of such orbital path for supplying water to the means for transferring water from the rearing pond means to the filter tank.

* * * * *

PO-1050
(5/69)

UNITED STATES PATENT OFFICE
CERTIFICATE OF CORRECTION

Patent No. 3,842,804     Dated October 22, 1974

Inventor(s) Bernard J. Christensen and Harry H. Chenoweth

It is certified that error appears in the above-identified patent and that said Letters Patent are hereby corrected as shown below:

Title page, section 73 should read as follows:

--Assignee: URS/Hill, Ingman, Chase & Co., Seattle, Washington--.

Title page, section 57, line 1, cancel "fish rearing" and insert --fish-rearing--.

Signed and sealed this 21st day of January 1975.

(SEAL)
Attest:

McCOY M. GIBSON JR.
Attesting Officer

C. MARSHALL DANN
Commissioner of Patents